United States Patent
Fechner et al.

(10) Patent No.: US 7,648,930 B2
(45) Date of Patent: Jan. 19, 2010

(54) HYDROLYSIS-RESISTANT GLASS, A METHOD OF MAKING SAID GLASS AND USES OF SAME

(75) Inventors: Joerg Fechner, Mainz (DE); Franz Ott, Konnersreuth (DE)

(73) Assignee: Schott AG, Mainz (DE)

( * ) Notice: Subject to any disclaimer, the term of this patent is extended or adjusted under 35 U.S.C. 154(b) by 386 days.

(21) Appl. No.: 11/437,520

(22) Filed: May 19, 2006

(65) Prior Publication Data

US 2006/0264313 A1 Nov. 23, 2006

(30) Foreign Application Priority Data

May 23, 2005 (DE) .................. 10 2005 023 702

(51) Int. Cl.
*C03C 3/091* (2006.01)
*C03C 3/093* (2006.01)

(52) U.S. Cl. .............. 501/66; 501/67; 501/64; 501/15; 65/66

(58) Field of Classification Search ............ 501/15, 501/64, 66, 67; 65/66
See application file for complete search history.

(56) References Cited

U.S. PATENT DOCUMENTS

| | | | | |
|---|---|---|---|---|
| 5,182,237 A * | 1/1993 | Brix | ............... | 501/66 |
| 5,747,399 A | 5/1998 | Kosokabe et al. | | |
| 6,118,216 A * | 9/2000 | Marlor | ............... | 313/636 |
| 6,204,212 B1 | 3/2001 | Kunert et al. | | |
| 6,284,686 B1 * | 9/2001 | Marlor | ............... | 501/64 |
| 6,635,592 B1 * | 10/2003 | Kosokabe et al. | ............... | 501/14 |
| 6,724,094 B2 * | 4/2004 | Kosokabe | ............... | 257/794 |
| 6,815,385 B2 * | 11/2004 | Kosokabe et al. | ............... | 501/21 |
| 7,196,027 B2 * | 3/2007 | Masumura et al. | ............... | 501/57 |
| 7,217,673 B2 * | 5/2007 | Naumann et al. | ............... | 501/66 |
| 7,375,043 B2 * | 5/2008 | Fechner et al. | ............... | 501/65 |
| 7,439,676 B2 * | 10/2008 | Walser et al. | ............... | 313/618 |
| 2004/0014583 A1 * | 1/2004 | Kosokabe et al. | ............... | 501/14 |
| 2005/0037911 A1 * | 2/2005 | Fechner et al. | ............... | 501/66 |
| 2005/0151116 A1 | 7/2005 | Fechner et al. | | |

FOREIGN PATENT DOCUMENTS

| | | |
|---|---|---|
| DE | 198 42 942 | 4/2000 |
| DE | 101 08 992 | 9/2002 |
| DE | 102 53 756 | 12/2003 |
| DE | 10 2004 027 119 | 12/2004 |
| DE | 10 2004 027120 | 12/2004 |
| JP | 2001 220175 | 8/2001 |

* cited by examiner

*Primary Examiner*—Karl E Group
*Assistant Examiner*—Elizabeth A Bolden
(74) *Attorney, Agent, or Firm*—Michael J. Striker

(57) ABSTRACT

The glass for a fluorescent light with a high hydrolytic resistance, which has composition, in % by weight based on oxide content of: $SiO_2$, 63-75; $B_2O_3$, 15-18; $Al_2O_3$, 3.2-4.5; $Na_2O$, 1-2; $K_2O$, 2-6; $\Sigma Na_2O+K_2O$, 3-8; MgO, 0-8; CaO, 0-10; SrO, 0-10; BaO, 0-10; ZnO, 0-5; $\Sigma MgO+CaO+SrO+BaO+ZnO$, 0-10; $ZrO_2$, 0-3; $CeO_2$, 0-10; $Fe_2O_3$, 0-1; $WO_3$, 0-3; $Bi_2O_3$, 0-5; $MoO_3$, 0-3; $TiO_2$, 0-10; $\Sigma Hf+Ta+W+Re+Os+Ir+Pt+La+Pr+Nd+Sm+Eu+Gd+Tb+Dy+Ho+Er+Tm+Yb+Lu$ in oxidic form, 0 to 5% by weight, as well as one or more conventional refining agents. The glass is characterized in that it contains no lithium and has a weight ratio of $Na_2O$ to $K_2O$ of less than one.

12 Claims, No Drawings

HYDROLYSIS-RESISTANT GLASS, A METHOD OF MAKING SAID GLASS AND USES OF SAME

CROSS-REFERENCE

German Patent Application DE 10 2005 023 702.9, filed May 23, 2005, also discloses the invention described and claimed hereinbelow and provides the basis for a claim of priority of invention under 35 U.S.C. 119 (a) to (d).

BACKGROUND OF THE INVENTION

1. The Field of the Invention

The present invention relates to a method of making a hydrolysis-resistant glass, the glass obtained with this method, and to articles made using this glass.

2. The Related Art

Glass with strong UV absorbing properties is known and is used especial-lly for manufacturing of gas discharge tubes and fluorescent lights and for making liquid crystal displays (LCD). Above all, a fluorescent light is used as a light source for a rear side illuminated display, i.e. the so-called backlight display.

Fluorescent lamp glass for the above-described usage, which absorbs UV radiation in the desired range, is known from U.S. Pat. No. 5,747,399. However it has been shown that this sort of glass is characterized by strong discoloration and in some cases strong solarization. Frequently a yellow brown discoloration arises when the raw material for the glass is melted.

A borosilicate glass containing zirconium oxide and lithium oxide of high strength, which is especially suited for use as a sealing glass with Fe—Co—Ni alloys, is known from DE-A 198 42 942. This sort of glass can contain color-imparting ingredients, such as $Fe_2O_3$, $Cr_2O_3$, CoO, and $TiO_2$.

A solarization-stable borosilicate glass is known from DE-A 101 08 992, which is used for a so-called backlight for the background of displays in PCs, laptops, pocket calculators, etc, may be sealed in a vacuum-tight manner with tungsten. This sort of glass has a high content of $SiO_2$ and $B_2O_3$, and a reduced amount of alkali oxides but with the sodium content clearly overweight.

DE 102 53 756 A1 describes a borosilicate glass with a high UV blocking action and its use as a fluorescent lamp. A glass of this sort has a high light permeability and a reduced UV transmission, but also a low processing temperature.

DE 10 2004 027 120 A1 describes a borosilicate glass with a high chemical resistance, which is manufactured with a raw material having a high iron content under oxidative conditions. This glass is also used for a fluorescent lamp, Xenon lamp, LCDs and displays, especially background lights.

Finally also DE 10 2004 027 119 A1 describes a UV radiation absorbing glass with small absorption in the visible range, which is substantially free of refining agents such as chloride, sulfate and/or antimony and which is refined under oxidative conditions with $As_2O_3$. This sort of glass contains $TiO_2$ if necessary together with $Fe_2O_3$ for adjustment of the UV cutoff. Although all these glasses described above have outstanding properties for the uses described, it has been shown that they have no sufficient hydrolytic resistance under extreme conditions and especially they react with a fluorescent coating. This sort of reaction leads to a change in the color shade or color location of the light generated by a fluorescent light with a lamp bulb made from these glasses.

SUMMARY OF THE INVENTION

It is an object of the present invention to provide a glass, which does not have the above-described disadvantages and which has a hydrolytic resistance during usage.

It is an additional object of the present invention to provide a glass that is stable and resistant to reaction with a fluorescent coating and thus does not change its color shade or color location during long-term usage.

It is a further object of the present invention to provide a glass, which is crystallization stable, is characterized by a high transmission in the visible range, and can be fused with a conventional alloy, such as a Fe—Co—Ni alloy, e.g. a KOVAR® alloy, and with metals such as tungsten and/or molybdenum.

These objects are attained by the glass claimed in the claims appended below, which is made by the method claimed in claims appended below.

According to the invention the above-described disadvantages are at least partially avoid because the glass melt is substantially free of lithium and especially because the ratio of sodium oxide to potassium oxide content is less than 1.

According to the invention it was also found that a chemical reaction of the glass with a fluorescent coating applied to it may be avoided when the glass is free of lithium and a part of the sodium is replaced by an increased or high amount of potassium.

A glass for a fluorescent light with a high hydrolytic resistance, which has a composition, in percent by weight on the basis of oxide content of:

| | |
|---|---|
| $SiO_2$ | 63-75 |
| $B_2O_3$ | 15-18 |
| $Al_2O_3$ | 2.5-4.5 |
| $Na_2O$ | 0-10 |
| $K_2O$ | 0-10 |
| MgO | 0-8 |
| CaO | 0-10 |
| SrO | 0-10 |
| BaO | 0-10 |
| ZnO | 0-5 |
| $ZrO_2$ | 0-3 |
| $CeO_2$ | 0-10 |
| $Fe_2O_3$ | 0-1 |
| $WO_3$ | 0-3 |
| $Bi_2O_3$ | 0-5 |
| $MoO_3$ | 0-3 |
| $TiO_2$ | 0-10, | wherein a sum total amount of $Na_2O+K_2O$ is 2 to 10% by weight; a sum total amount of MgO+CaO+SrO+BaO+ZnO is 0 to 10% by weight; a sum total amount of Hf+Ta+W+Re+Os+Ir+Pt+La+Pr+Nd+Sm+Eu+Gd+Tb+Dy+Ho+Er+Tm+Yb+Lu in oxidic form is 0 to 5% by weight; the glass melt contains no lithium; and a weight ratio of $Na_2O$ to $K_2O$ is $\leq 1$.

The ratio of sodium oxide to potassium oxide content in the glass according to the invention is advantageously less than 1, especially less than 0.8, but a ratio less than 0.6 and especially less than 0.5 is especially preferred. In a preferred embodiment the ratio of sodium oxide to potassium oxide is not less than 0.15 and especially is greater than or equal to 0.2. However the ratio is most preferably greater than 0.25, and is especially greater than 0.28.

It is important that the glass according to the invention is free of lithium except for unavoidable amounts of lithium due to the presence of impurities. This means that the content of lithium should be kept less than 100 ppm, preferably less than 10 ppm. Moreover the glass or the glass melt according to the invention can contain additional conventional ingredients, such as Hf, Ta, W, Re, Os, Ir, Pt, La, Pr, Nd, Sm, Eu, Gd, Tb, Dy, Ho, Er, Tm, Yb, Lu in oxidic form in an amount of from 0 to 5% by weight.

According to the invention it was found that the stability and positive properties, such as crystallization stability and chemical resistance, can be still further increased when the sum of the content of the alkali oxides, i.e. the ratio of sum total amount of sodium oxide and potassium oxide to the amount of aluminum oxide present, is not greater than 2.5. However a ratio of less than 2.3, especially less than 2.1, is particularly preferred. A ratio of these alkali oxides to aluminum oxide of at most, i.e. under, 2, is most preferred. However it is desirable and preferred that the ratio of these alkali oxides to aluminum oxide is at most 1.5, but a ratio above this value is even more preferable. A ratio of from 1.55 to 1.6 is especially preferred.

It has been shown that the melt according to the invention may be made with all known standard refining agents in the conventional concentrations. Conventional refining agents are especially chlorides, sulfates, $As_2O_3$ and $Sb_2O_3$.

The green glass according to the invention contains at least 63% by weight, although at least 65% by weight and especially at least 68% by weight of $SiO_2$ is particularly preferred. The upper limit for $SiO_2$ amounts to 75% by weight, but upper limit values of 74% by weight and especially 73% by weight are preferred. The $B_2O_3$ is contained in the glass according to the invention in an amount of at least 15% by weight, but at least 15.5% by weight, especially at least 16% by weight is preferred. Particularly preferred are minimum amounts of $B_2O_3$ of at least 16.3% by weight. The upper limit for the $B_2O_3$ in the glass according to the invention amounts to at most 18% by weight, but a maximum amount of 17.5% by weight is particularly preferred as the upper limit.

The content of $Al_2O_3$ in the glass according to the invention is at least 2.5% by weight, but minimum amounts of 2.8% by weight, especially of 3% by weight are preferred. A minimum amount of 3.2% by weight is most preferred. The upper limit for the amount of $Al_2O_3$ is 4.5% by weight is preferred, but an upper limit of 4.4% by weight, especially 4.3% by weight, is particularly preferred.

$Na_2O$ is contained in the glass according to the invention in an amount of >0 to 10% by weight, but a minimum amount of from 0.2 or 0.6% by weight is preferred. A minimum amount of 1.0% by weight is especially preferred, but a minimum amount of $Na_2O$ of 1.2% by weight is most preferred. A maximum amount of $Na_2O$ amounts to at most 7% by weight, but a maximum amount of 5% by weight and especially of 3% by weight is especially preferred. An amount of 2.5% by weight, especially 2.3% by weight, of $Na_2O$, is most preferred. The content of $K_2O$ in the glass according to the invention amounts to from 0 to 10% by weight, but a minimum amount of 1% by weight, especially 1.5% by weight, is especially preferred. A minimum amount of 2% by weight, especially of 2.5% by weight, is preferred, but a minimum amount of $K_2O$ of 3% by weight or 3.5% by weight is especially preferred. An especially preferred embodiment of the glass according to the invention comprises a minimum amount of 4% by weight of $K_2O$. The usual maximum amount amounts to 10% by weight, but 8% by weight, especially an amount of 7% by weight, is preferred. A maximum amount of 6.5% by weight is especially preferred. A sum total amount of $Na_2O+K_2O$ is preferably at least 2% by weight and at most 10% by weight, but minimum amounts of at least 3% by weight, especially at least 4% by weight and at most 8% by weight are preferred, especially a maximum amount of 7% by weight.

In a preferred embodiment of the glass chloride is added to the melt for refining in the form of alkali chlorides or alkaline earth chlorides, especially NaCl and/or KCl. Although the glass according to the invention can contain small amounts of $CeO_2$, PbO and $Sb_2O_3$ and $As_2O_3$, the glass is preferably free of these chemical species. In the event that these substances are present they should only be present in respective amounts of from 0.01 to 1% by weight. In so far as iron is present, it should be converted into its +3 oxidation state by the oxidizing conditions during the melt and thus causes no further discoloration in the visible wavelength range. The glass and/or melt preferably contains from 0.1 to 1% by weight of $TiO_2$ in suitable embodiments.

Although the glass nitrate, preferably in the form of alkali and/or alkaline earth nitrates and zinc nitrate, is added to the glass in the melt, the $NO_3$ concentrations in the finished glass amount to only a most 0.01% by weight and in many cases at most 0.001% by weight after refining.

The glass according to the invention not only has high crystallization stability, but is fusible with molybdenum and/or iron-cobalt-nickel alloys like those that are obtainable under the trademark or tradename KOVAR®, VACON® 11, or FERNICO. The glass of the invention is most preferably fused with tungsten metal.

The glass of this sort is especially suitable for making fluorescent lights or lamps. A pre-finished glass, especially a tube, is coated with a fluorescent solution and subsequently this fluorescent coating is burned in at elevated temperatures. This sort of light according to the invention maintains its color shape or color location during usage.

The glass according to the invention is suitable for use in glass discharge tubes and fluorescent lamps, especially miniaturized fluorescent lamps, which are especially suitable for illumination, especially background lighting, of electronic display units, such as displays and LCD display screens, for example for mobile telephones and computer monitors. Preferred displays and display screens are the so-called flat displays, especially flat backlight arrangements. Halogen-free lighting means are especially preferred, like those based on discharges in noble gases, such as argon, neon, xenon or their mixtures (Xenon lamps). Also the Hg containing filling gases are understandably suitable. This has proven to be especially environmentally friendly.

In a special embodiment the glass for "flat" backlights is structured or not structured. This can be made, inter alia, by a float glass process.

A further preferred embodiment includes a so-called EEFL ("external electrode fluorescent lamp") made with the glass according to the invention. Here the electrodes are outside of the lamp body. Ignition and operation of the lamp takes place from the outside. The glass is also preferably used in tubular and flat glass embodiments.

The following examples serve to illustrate the invention in further detail, but should not be considered as limiting the appended claims.

EXAMPLES

The glasses A1 and A2 of the present invention and the comparative glasses V1 to V9, whose composition and properties are described in Table I, were melted. The raw material was melted in a quartz glass vessel at a temperature of 1620° C. and the melt was refined.

The hydrolytic resistances of the glasses A1 and A2 according to the invention was measured. They fall into the most resistant hydrolytic resistance classes of glass. Hardly any devitrification occurred at a one hour thermal load at temperatures in a temperature range of 600 to 1200° C. Furthermore they are characterized by a very small fusion or melt tension with tungsten (VSp W).

TABLE I

GLASS COMPOSITIONS OF THE INVENTION AND COMPARATIVE COMPOSITIONS AND THEIR PROPERTIES

|  | A1 | A2 | V1 | V2 | V3 | V4 |
|---|---|---|---|---|---|---|
| $SiO_2$ | 70.76 | 71.24 | 72.1 | 72.2 | 71.16 | 72.30 |
| $B_2O_3$ | 17.00 | 17.00 | 15.3 | 15.5 | 17.00 | 17.00 |
| $Al_2O_3$ | 3.50 | 4.00 | 4.1 | 4 | 4.00 | 2.10 |
| $Li_2O$ | — | — | 0.4 | 0.5 | 0.15 | 0.10 |
| $Na_2O$ | 1.90 | 1.50 | 1.3 | 1.5 | 1.50 | 1.00 |
| $K_2O$ | 4.52 | 4.91 | 4.5 | 3.6 | 4.50 | 5.10 |
| MgO | 1.42 | 0.31 | 0.3 | 0.4 | 0.50 | 1.30 |
| CaO | 0.20 | 0.34 | 0.5 | 0.7 | 0.49 | 0.40 |
| SrO |  |  |  |  |  |  |
| BaO |  |  | 0.8 | 1 |  |  |
| $ZrO_2$ |  |  | 0.2 | 0.1 |  |  |
| $TiO_2$ | 0.70 | 0.70 | 0.5 | 0.5 | 0.70 | 0.70 |
| Sum | 100.00 | 100.00 | 100.00 | 100.00 | 100.00 | 100.00 |
| $\alpha \times [10^4]/K$ | 4.28 | 4.20 | 4.23 |  | 4.14 | 4.02 |
| Tg, ° C. | 530 | 511 | 524 |  | 513 | 527 |
| VA | 1185 | 1195 | 1170 |  | 1192 | 1168 |
| VSp W | −nd | −64 | −30 |  | 5 | −87 |
| H, μg/g* | 26 | 39 |  |  | 20 | 93 |
| H class*' | 1 | 2 | 1 | 1 | 1 | 3 |
| Crystallization | none up to 1200° C. | None up to 1200° C. |  |  | none up to 1200° C. |  |

|  | V5 | V6 | V7 | V8 | V9 |
|---|---|---|---|---|---|
| $SiO_2$ | 71.68 | 72.30 | 72.30 | 72.50 | 72.81 |
| $B_2O_3$ | 16.95 | 17.00 | 17.00 | 16.70 | 17.00 |
| $Al_2O_3$ | 4.00 | 2.00 | 1.50 | 1.20 | 2.00 |
| $Li_2O$ | 0.33 | — | — | — | — |
| $Na_2O$ | 1.05 | 1.50 | 1.10 | 1.10 | 1.90 |
| $K_2O$ | 4.85 | 5.00 | 5.00 | 6.70 | 4.50 |
| MgO | 0.45 | 1.20 | 2.10 | 0.40 | 0.50 |
| CaO | — | 0.30 | 0.30 | 0.60 | 0.64 |
| SrO |  |  |  |  |  |
| BaO |  |  |  |  |  |
| $ZrO_2$ |  |  |  |  |  |
| $TiO_2$ | 0.70 | 0.70 | 0.70 | 0.80 | 0.70 |
| Sum | 100.00 | 100.00 | 100.00 | 100.00 | 100.00 |
| $\alpha \times [10^4]/K$ | 4.05 | 4.16 | 4.00 | 4.61 | 4.10 |
| Tg, ° C. | 498 | 528 | 543 | 536 | 522 |
| VA | 1184 | 1156 | 1176 | 1126 | 1145 |
| VSp W | −36 | 48 | −75 | 324 | −10 |
| H, μg/g* | 38 | 136 | 151 | 109 | 171 |
| H class*' | 2 | 3 | 3 | 3 | 3 |
| Crystallization | Small Crystals, 915-975° C. |  |  |  | Small Crystals, 915-975° C. |

*Hydrolytic resistance in micrograms of $Na_2O$/g glass
*'Hydrolytic resistance class of the glass Unless otherwise indicated, all percentages are percentages by weight.

While the invention has been illustrated and described as embodied in a method of making a hydrolysis-resistant glass, the glass obtained with this method, and to various articles made using this glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a glass for a fluorescent lamp with a high hydrolytic resistance, said method comprising melting a raw material to form a glass melt, said glass melt having a composition, in percent by weight on the basis of oxide content of:

| $SiO_2$ | 63-75 |
| $B_2O_3$ | 15-18 |
| $Al_2O_3$ | 3.2-4.5 |

-continued

| | |
|---|---|
| $Na_2O$ | 1-2 |
| $K_2O$ | 2-6 |
| MgO | 0-8 |
| CaO | 0-10 |
| SrO | 0-10 |
| BaO | 0-10 |
| ZnO | 0-5 |
| $ZrO_2$ | 0-3 |
| $CeO_2$ | 0-10 |
| $Fe_2O_3$ | 0-1 |
| $WO_3$ | 0-3 |
| $Bi_2O_3$ | 0-5 |
| $MoO_3$ | 0-3 |
| $TiO_2$ | 0-10, | at least one refining agent in a sufficient amount for refining the glass melt; and wherein a sum total amount of $Na_2O+K_2O$ is 3 to 8% by weight; a sum total amount of $MgO+CaO+SrO+BaO+ZnO$ is 0 to 10% by weight; a sum total amount of Hf+Ta+W+Re+Os+Ir+Pt+La+Pr+Nd+Sm+Eu+Gd+Tb+Dy+Ho+Er+Tm+Yb+Lu in oxidic form is 0 to 5% by weight; and a weight ratio of $Na_2O$ to $K_2O$ is 0.2 to 0.5; and containing no lithium except for an amount of said lithium up to 100 ppm due to the presence of impurities; and wherein said glass has a hydrolytic resistance class of 1 or 2.

2. The method as defined in claim 1, wherein a weight ratio of the sum total amount of $Na_2O+K_2O$ to aluminum oxide is $\leq 2.5$.

3. The method as defined in claim 1, wherein a weight ratio of the sum total amount of $Na_2O+K_2O$ to aluminum oxide amounts to from 1.5 to 2.

4. The method as defined in claim 1, wherein the $SiO_2$ and/or the raw material contains more than 100 ppm $Fe_2O_3$.

5. The method as defined in claim 4, wherein the raw material for the glass melt contains up to a maximum of 6% by weight of a sum total of alkali and alkaline earth nitrates.

6. A glass for a fluorescent light with a high hydrolytic resistance, said glass having a composition, in percent by weight on the basis of oxide content of:

| | |
|---|---|
| $SiO_2$ | 63-75 |
| $B_2O_3$ | 15-18 |
| $Al_2O_3$ | 3.2-4.5 |

-continued

| | |
|---|---|
| $Na_2O$ | 1-2 |
| $K_2O$ | 2-6 |
| MgO | 0-8 |
| CaO | 0-10 |
| SrO | 0-10 |
| BaO | 0-10 |
| ZnO | 0-5 |
| $ZrO_2$ | 0-3 |
| $CeO_2$ | 0-10 |
| $Fe_2O_3$ | 0-1 |
| $WO_3$ | 0-3 |
| $Bi_2O_3$ | 0-5 |
| $MoO_3$ | 0-3 |
| $TiO_2$ | 0-10, | wherein a sum total amount of $Na_2O+K_2O$ is 3 to 8% by weight; a sum total amount of $MgO+CaO+SrO+BaO+ZnO$ is 0 to 10% by weight; a sum total amount of Hf+Ta+W+Re+Os+Ir+Pt+La+Pr+Nd+Sm+Eu+Gd+Tb+Dy+Ho+Er+Tm+Yb+Lu in oxidic form is 0 to 5% by weight; and a weight ratio of $Na_2O$ to $K_2O$ is 0.2 to 0.5; and containing no lithium except for an amount of said lithium up to 100 ppm due to the presence of impurities; and wherein said glass has a hydrolytic resistance class of 1 or 2.

7. The glass as defined in claim 6, containing from 66 to 73% by weight of said $SiO_2$, from 16 to 18% by weight of said $B_2O_3$, from 3.5 to 4.5% by weight of said $Al_2O_3$.

8. The glass as defined in claim 6, wherein a weight ratio of the sum total amount of $Na_2O+K_2O$ to aluminum oxide is $\leq 2.5$.

9. The glass as defined in claim 6, containing, in respective amounts of from 0.01 to 1% by weight, at least one refining agent selected from the group consisting of alkali chlorides, alkaline earth chlorides, sulfates, $As_2O_3$, $Sb_2O_3$, PbO and $CeO_2$.

10. A gas discharge lamp, a fluorescent lamp, or a xenon lamp, wherein said lamp comprises the glass as claimed in claim 6.

11. A LCD display, a computer monitor display, or a telephone display, wherein said display comprises the glass as claimed in claim 6.

12. An article comprising a tungsten member sealed or fused with the glass as claimed in claim 6.

* * * * *